United States Patent
Reuter et al.

(10) Patent No.: US 6,481,452 B2
(45) Date of Patent: Nov. 19, 2002

(54) HIGH PRESSURE, HIGH FLOW PUMP PRIME VALVE

(75) Inventors: David Fredrick Reuter, Beavercreek, OH (US); E. Wayne Lloyd, Lebanon, OH (US); Alejandro Moreno, El Paso, TX (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/732,232

(22) Filed: Dec. 7, 2000

(65) Prior Publication Data
US 2002/0069919 A1 Jun. 13, 2002

(51) Int. Cl.[7] ............................................... F16K 31/06
(52) U.S. Cl. ............... 137/14; 137/601.14; 137/601.21; 137/630.15
(58) Field of Search .............................. 137/14, 601.14, 137/601.21, 630.15

(56) References Cited

U.S. PATENT DOCUMENTS

| | | | | |
|---|---|---|---|---|
| 5,467,797 A | * | 11/1995 | Seetharaman et al. | 137/601.14 |
| 5,711,583 A | * | 1/1998 | Bareiss et al. | 137/630.15 X |
| 5,810,330 A | * | 9/1998 | Eith et al. | 137/630 |
| 6,032,692 A | * | 3/2000 | Volz | 137/630.14 |
| 6,209,970 B1 | * | 4/2001 | Kamiya et al. | 303/119.2 |
| 6,254,200 B1 | * | 7/2001 | Ganzel | 303/119.2 |

* cited by examiner

Primary Examiner—Gerald A. Michalsky
(74) Attorney, Agent, or Firm—Scott A. McBain

(57) ABSTRACT

The invention is a two-stage, two-poppet prime valve assembly for use in high pressure applications such as vehicle braking systems. The valve assembly has two valve seats and two plungers for allowing the valve assembly to open under high pressure while providing minimal internal flow restrictions to enhance cold temperature and low pressure operation. The two-stage, two poppet valve assembly contains two separate flow paths, one being high pressure, relatively low flow called a stage one, and the other being relatively low pressure, high flow called a stage two. In addition, the valve incorporates a reverse flow bypass feature that is capable of controlling flow at very high pressure and allowing reverse flow with a very low pressure drop.

19 Claims, 3 Drawing Sheets

HIGH PRESSURE, HIGH FLOW PUMP PRIME VALVE

BACKGROUND

This invention relates generally to a pump valve for use in high pressure applications such as advanced controlled vehicle braking systems.

In conventional design of hydraulic modulators for controlled braking systems where brake self-apply is required, such as traction control, and vehicle stability enhancement systems, it is usual to incorporate a normally closed valve assembly between a main master cylinder port and an inlet of a recirculation pump. The valve functions to isolate flow from a master cylinder to the pump inlet when the pump is idle, and to provide a flow path to the pump inlet when the pump is running. Traditionally, a normally closed single poppet-type valve with a suitably designed poppet and seat is commonly employed for this function. This type of valve works well for all systems which permit valve actuation under very low braking pressures.

However, under high master cylinder pressures, the force requirements needed to open the single large poppet valve are high. These force requirements to open the valve are proportional to an area of a main control orifice valve seat of the valve assembly. In order to open the valve under high pressures an exceedingly large solenoid coil and a large amount of magnetic force as generated by an electrical current are required. In the newer type of controlled braking systems, such as vehicle stability enhancement, such high pressure requirements frequently occur. Failure of the valve to open during high pressure use is unacceptable. While the newer brake systems require operation under high pressures, traditional requirements such as operation during very low pressure, cold temperatures remain a requirement of the valve assembly.

Previous solutions to these requirements have utilized two separate valves, one for high pressure/low flow and one for low pressure/high flow situations. However, the two valve designs are more costly and require additional packaging space.

Thus, it is desired to design an efficient high flow pump valve which has the capability to function during all expected conditions including opening under high braking pressures.

SUMMARY OF THE INVENTION

The present invention is an efficient two-stage, two-poppet prime valve assembly. The valve assembly utilizes one valve and two poppets for allowing the valve assembly to open under high pressure while providing minimal internal flow restrictions to enhance cold temperature and low pressure operation. Such conditions are present in modern vehicle braking systems. The two-stage poppet design contains two separate flow paths, one being high pressure, relatively low flow comprising a stage one, and the other being relatively low pressure, high flow comprising a stage two. In addition, the valve incorporates a reverse flow bypass feature that is capable of checking flow at very high pressure yet allowing reverse flow with a very low pressure drop.

The various features and advantages of this invention will become apparent to those skilled in the art from the following detailed description of the presently preferred embodiment. The drawings that accompany the detailed description can be described as follows:

DETAILED DESCRIPTION OF A PREFERRED EMBODIMENT

Figure 1:
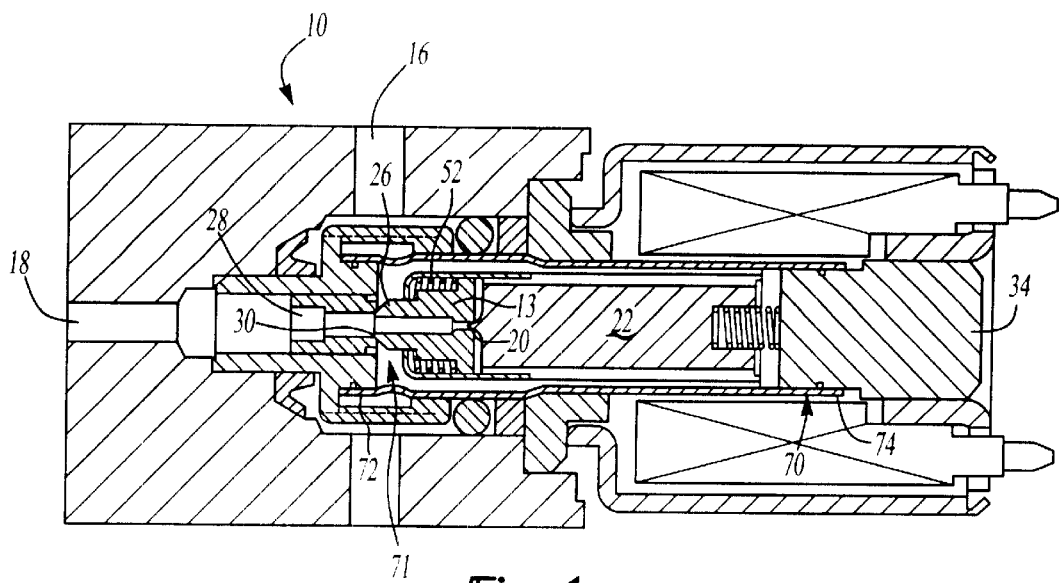
FIG. 1 is a cross-sectional view of a valve assembly of the present invention.

Referring to the Figures, wherein like numerals indicate like or corresponding parts throughout the several views, in FIG. 1, a cross sectional view of a dual poppet, two stage, high pressure valve assembly for use in vehicle braking systems is shown generally at 10. The valve assembly 10 is connected through a master cylinder inlet port 16 to a brake system main master cylinder line (not shown). The valve assembly is also connected to a recirculation pump(not shown) through a pump inlet port 18. The assembly 10 is shown with two poppets, a high pressure poppet 20 and a low pressure poppet 26 between a main orifice 28 and a primary plunger 22. The high pressure poppet 20 seals against a seat 24 formed at a top of secondary plunger 13. The low pressure poppet 26 seals against a seat 30 formed at the top of main orifice 28.

Figure 2:
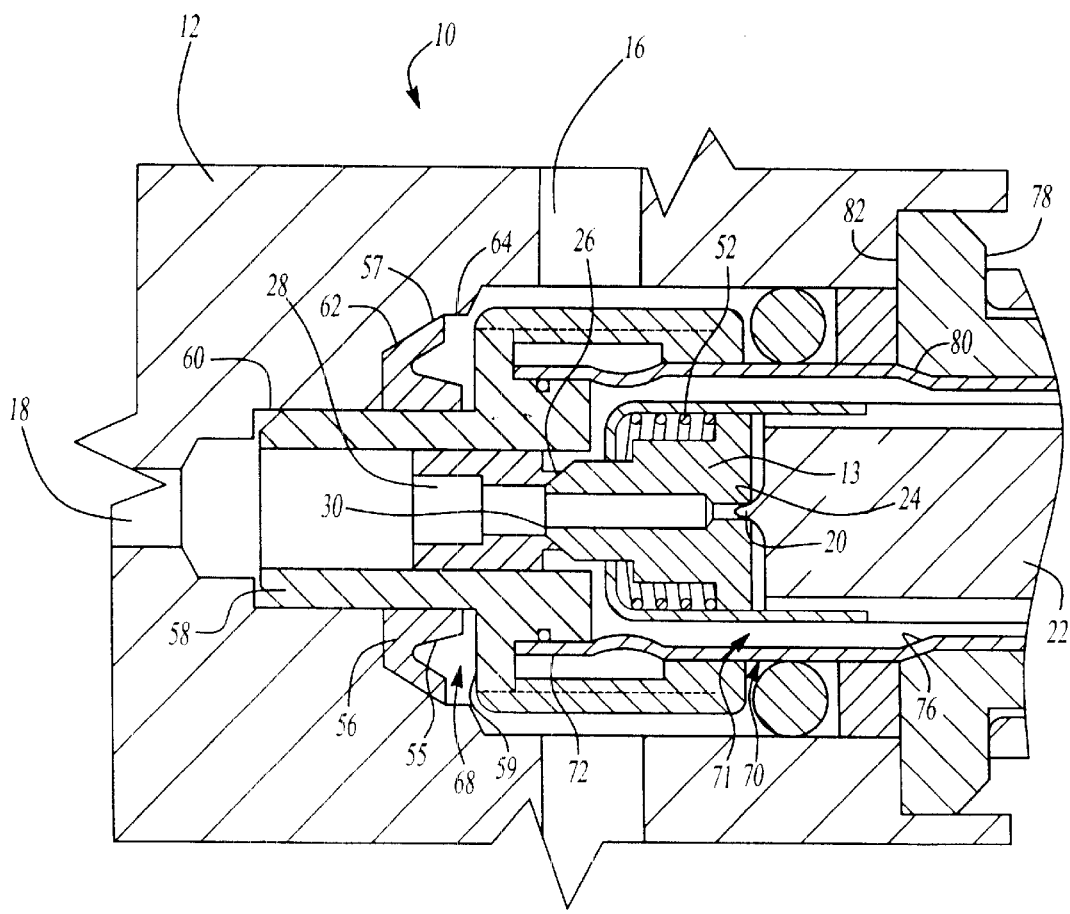
FIG. 2 is a cross sectional view of the assembly showing in detail a two poppet design.

In FIG. 2, the two poppet valve assembly 10 is shown in closer detail. Under normal vehicle brake operation, a brake fluid flow path is blocked between the pump inlet port 18 and the master cylinder inlet port 16. Blockage to flow is caused by the high pressure poppet 20 formed by a nose 21 of the primary plunger 22 which seals at the high pressure valve seat 24 of the secondary plunger 13. In addition, a nose 26 of the secondary plunger 13 forming the low pressure poppet 26 seals the main orifice 28 at the main valve seat 30. The two poppets 20 and 26 and their corresponding valve seats 24 and 30 provide an economical means to seal master cylinder pressure from the master cylinder port 16 from the pump inlet port 18 under normal vehicle braking operation.

Referring again to FIGS. 1–2, a thin walled tube 70 has a first end 72 affixed to value housing 58 and a second end affixed to stator 34 defining a cavity 71 housing primary plunger 22, secondary plunger 13, and first stage return spring 52 thereby affixing the valve components within housing 12. Tube 70 includes a flared step 76 at a point intermdiate the length of tube 70 such that first end 72 has a diameter greater than second end 74. Housing 12 includes a shoulder 82 upon which is affixed flange 78. Flange 78 includes a bore for receiving therein second end 74 of tube 70 and further includes a chamfer 80 that bears against flared step 76. In this manner, flange 78 bears against and affixes tube 70 within housing 12 with out requiring the use of additional means to facilitate the retention of the valve components within housing 12.

Figure 3:
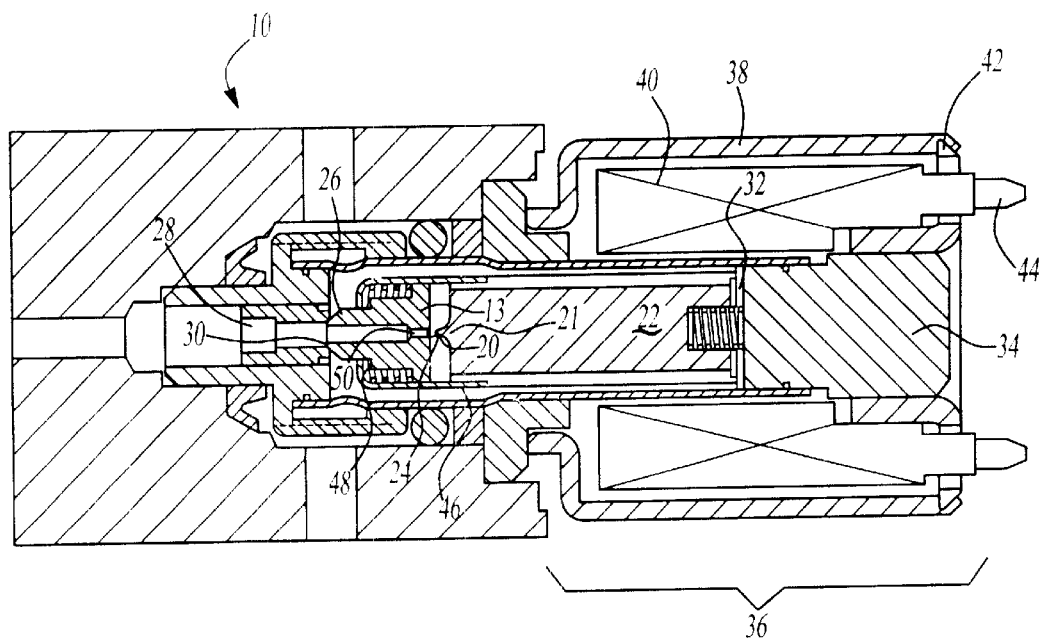
FIG. 3 is a cross sectional view of the assembly in a stage one of operation.

Whenever a controlled vehicle brake system is required to self-apply the brakes or to boost a pressure above that which a driver may be initiating through the main master cylinder line, it becomes necessary to open a passageway between the master cylinder inlet port 16 and the pump inlet port 18. In FIG. 3, the valve assembly 10 is shown in a stage one of operation with an open passageway or high pressure orifice 50 formed in the secondary plunger 13 between the primary plunger 22 and the poppet 20. Due to the high pressure valve seat 24 sealing on a relatively small diameter in comparison to the main valve seat 30, a minimal magnetic force is required in a main air gap 32 between the primary plunger 22 and a stator 34 to move primary plunger 22 and open the passageway. Primary plunger 22 is constructed of a magnetic material such as iron. The minimal magnetic force is generated by a small coil assembly shown generally at 36. The coil assembly 36 consists of a case 38, a bobbin 40, a top 42, and a pair of terminals 44. During Stage one as shown in FIG. 3 the primary plunger 22 moves until a plunger cage 46 contacts a positive stop 48 located on the secondary plunger 13. At this stage in the process, the main air gap 32 has been reduced and the high pressure poppet 20 as formed by nose 21 of the plunger 22 has moved far enough from the high pressure valve seat 24 that significant flow due to the high master cylinder pressure present inside the valve assembly 10 can feed the pump inlet 18 to maintain optimized pumping efficiencies even though the main valve seat 30 remains closed.

Figure 4:
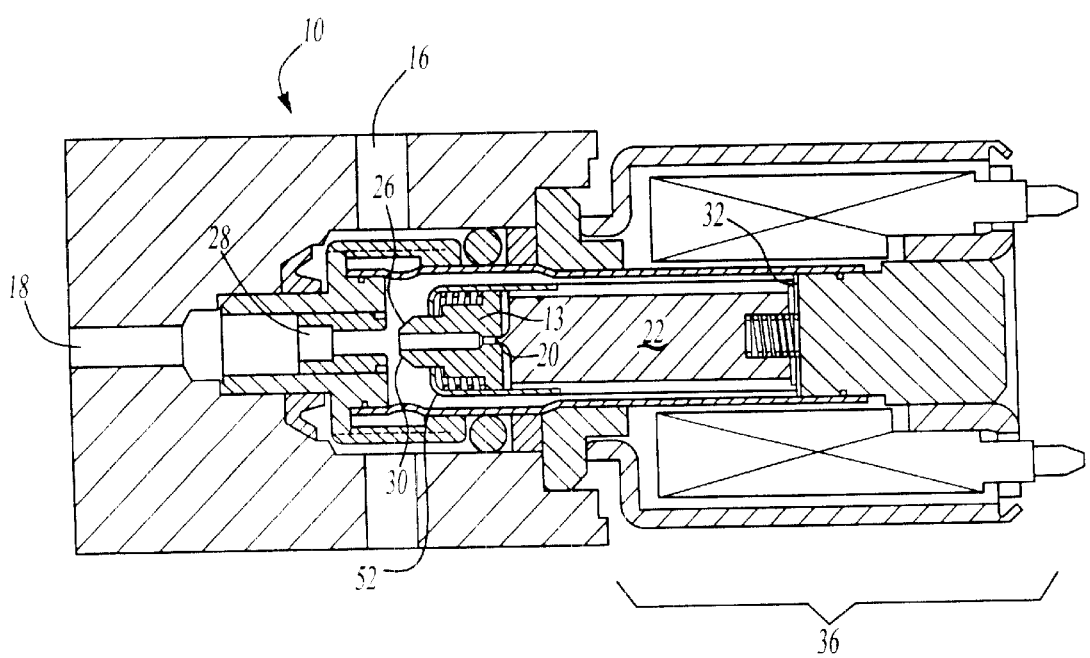
FIG. 4 is a cross sectional view of the assembly in a stage two of operation.

In FIG. 4, the valve assembly 10 is shown in a stage two position. If master cylinder pressures drop, flow through the high pressure orifice 50 will no longer be sufficient to maintain pumping efficiencies. Therefore, prior to reaching a crossover pressure which will initiate significant pump cavitation, it becomes necessary for the main valve seat 30 to be opened so that relatively unrestricted flow through the main orifice 28 will be available to feed the pump inlet 18. The coil assembly 36 is designed to be able to open the main valve seats 30 at a pressure slightly higher than a pump cavitation pressure. Additional magnetic force is required to move the plunger cage 46 and secondary plunger 13 in stage two, however, the magnetic force requirement is still reasonably low since the main air gap 32 has been significantly reduced by travel of the primary plunger 22 during stage one. After the nose 20 of the secondary plunger 13 opens the main valve seat 30, a first stage return spring 52 is able to move the low pressure poppet 26 back against the nose 20 of the primary plunger 22 to recover first stage travel loss. At the stage two position, the valve assembly 10 is fully opened with minimal flow restriction through the main orifice 28.

Figure 5:
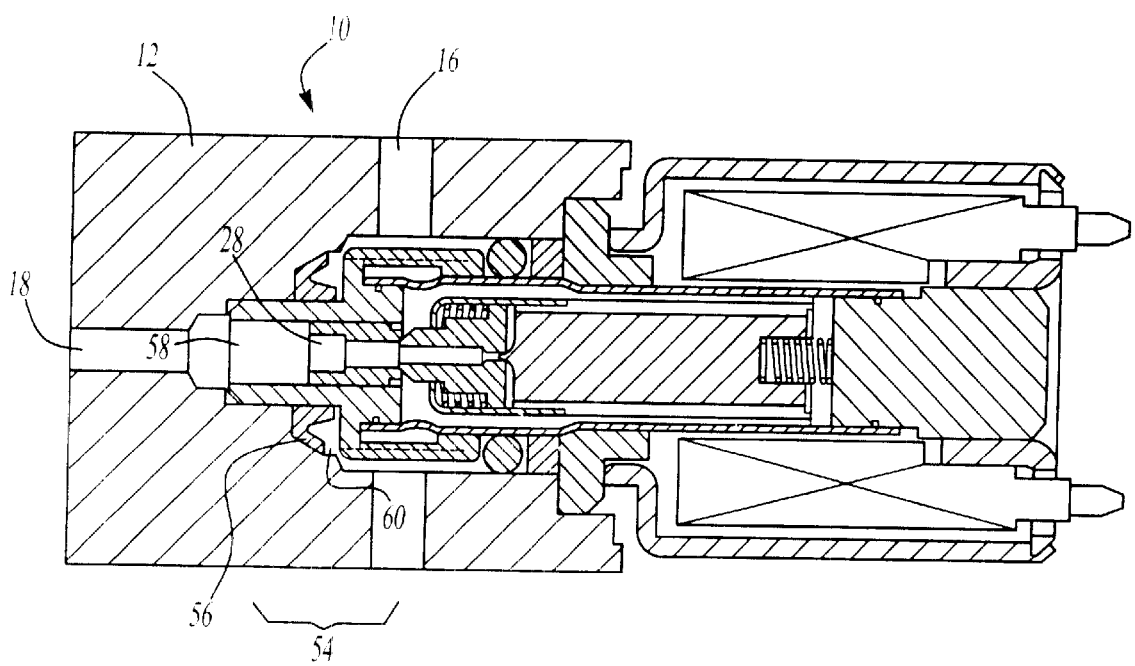
FIG. 5 is a cross sectional view of the assembly in a closed state.

In FIGS. 2 and 5 the valve assembly 10 is shown in a fully closed condition. An additional feature contained within the valve assembly 10 is a reverse flow bypass valve shown generally at 54. It is beneficial in hydraulic modulators using valves of this type, that either air or brake fluid flow relatively unrestricted from the pump inlet port 18 to the master cylinder inlet port 16. This is accomplished in valve assembly 10 by a lip seal 56 which seals pressure in one direction only between a pair of bores 60 and 64 for fluid flow between housing 12 and a valve housing 58. The bore 62 in housing 12 is constructed of a tapered design at a bottom which fully supports the back end of the lip seal 56. Tip 57 of lip seal 56 interferes primarily with the tapered bore 62 to permit relatively unrestricted air or fluid flow through bore 60 in the unchecked (left to right as shown in FIGS. 2 and 5) flow direction. A suitable gap 68 exists between end 55 of lip seal 56 and flange 59 of valve housing 58 to permit axial displacement of lip seal 56. The axial displacement occurs when fluid flowing in the unchecked direction (left to right) and stops when the pressure in the master cylinder inlet port 16 is increased to exceed that of the pump inlet port 18. When such pressure reversal occurs, lip seal 56 is axially displaced to the left causing tip 57 of lip seal 56 to again interfere with tapered bore 62 and thus prevent a right to left fluid flow. The geometry of bores 60, 62, and 64 allows for repeated high pressure cycling as is typically found in a brake system while also allowing reverse flow of either air or brake fluid to be initiated at a very low pressure, for example, less than 140 millibar (2 psi). This is important when using the valve assembly 10 for reverse flow of air during a typical evacuation cycle when processing a brake system at a vehicle assembly plant, or when using the bypass feature to empty pump inlet accumulators at the end of a controlled braking event. Using the bypass feature eliminates the need to run the pump for an extra duration at the end of such a controlled braking event which reduces wear on the pump elements and also reduces noise that can be discerned by the driver of a vehicle.

The invention has been described in an illustrative manner, and it is to be understood that the terminology that has been used is intended to be in the nature of words of description rather than of limitation. Obviously, many modifications and variations of the present invention are possible in light of the above teachings. It is, therefore, to be understood that within the scope of the appended claims the invention may be practiced otherwise than as specifically described.

What is claimed is:

1. A high pressure valve assembly comprising:
   a housing,
   a pump inlet port and a master cylinder inlet port disposed within said housing,
   a main orifice connected to said pump inlet port by a main valve and to said master cylinder inlet port,
   a high pressure orifice connected to said pump inlet port and to said master cylinder inlet port,
   a tube having an intermediate flared step and at least paritally defining a cavity, said cavity receiving therein:
   a movable primary plunger connected to a coil assembly, said coil assembly generating a magnetic force to move said primary plunger,
   a secondary plunger disposed between said primary plunger and said main orifice,
   a high pressure poppet comprisinga solid integral tapered nose projecting from said primary plunger and extending into said high pressure orifice is formed on said primary plunger and a low pressure poppet formed on said secondary plunger,
   said secondary poppet is partially contained within a plunger cage and biased toward said primary plunger for opening and closing said main orifice and said high pressure orifice; and
   a flange bearing against said flared step retaining said tube within said housing.

2. The valve assembly as recited in claim 1, wherein said primary orifice has a low pressure valve seat, and said secondary plunger has a high pressure valve seat for sealing said main valve.

3. The valve assembly as recited in claim 2, wherein said plunger nose engages said high pressure valve seat to close said high pressure orifice and is removable from contact with said high pressure valve seat of said secondary plunger for opening said high pressure orifice during a first stage of operation of said valve assembly.

4. The valve assembly as recited in claim 3, wherein said nose of said primary plunger is returned to contact with said high pressure valve seats and a nose of said secondary plunger is removed from contact with said main valve seats for opening said main orifice during a second stage of operation of said valve assembly.

5. The valve assembly as recited in claim 1, wherein said coil assembly comprises of a case, a top, a bobbin, and a plurality of terminals.

6. The valve assembly as recited in claim 1, further comprising a reverse bypass valve for reversing a flow of one of brake fluid or air through said valve assembly.

7. The valve assembly as recited in claim 6, wherein said reverse bypass valve comprises of a lip seal for sealing a bore between a valve housing connected to said pump inlet port.

8. The valve assembly as recited in claim 7, wherein said lip seals comprises of two lip seals.

9. The valve assembly as recited in claim 8, wherein said bore has a tapered geometry for supporting said lip seals.

10. A method of controlling the flow of brake fluid and air through a valve assembly comprising the steps of:

(a) inputting one of brake fluid or air into a valve assembly through a pump inlet port and a master cylinder inlet port;

(b) opening a high pressure orifice during a stage one high pressure situation by retracting a solid integral tapered nose of a primary plunger from contact with a high pressure valve seat contained on a secondary plunger housed within the valve assembly while leaving a main orifice closed thereby allowing minimal of the one barke fluid or air to flow through the high pressure orifice;

(c) closing the high pressure orifice during a low pressure stage two situation by closing the nose of the primary plunger against the high pressure valve seat of the secondary plunger while retracting a nose of the same secondary plunger from a the main valve seat allowing a large amount of flow through the main orifice; and (d) allowing upon closure of both the main orifice and high pressure orifice the one of brake of fluid or air to flow in a reverse unchecked direction to flow past an axially displaceable lip seal displaced from a first bore to a second bore.

11. The method as recited in claim 10, wherein the primary plunger is moved by a magnetic force generated by a coil assembly.

12. The method as recited in claim 11, wherein the coil assembly comprises of a case, a top, a bobbin, and a plurality of terminals.

13. A high pressure valve assembly comprising:

a housing defining at least one bore therein and having a shoulder at one end and a pump inlet port and a master cylinder inlet port disposed within said housing at an opposite end;

a valve housing disposed within said at least one bore, said valve housing defining a main orifice in fluidic communication with said inlet port, and further defining a first seat;

a tube having one end affixed to said valve housing and received in said at least one bore, said tube further having an intermediate flared step and at least partially defining a cavity therein;

a primary and secondary plunger both sildably received within said tube, said secondary plunger having a high pressure orifice smaller in diameter than said main orifice, said primary plunger operable between an open and a closed position, said primary plunger open position corresponding to high pressure fluidic communication between said main orifice and said master cylinder inlet port, and said primary plunger closed position corresponding to blockage of said high pressure orifice;

said secondary plunger operable between an open and a closed position and movable in concert with said primary plunger, said secondary open position corresponding to low pressure fluidic communication between said main orifice and said master cylinder inlet port bypassing said high pressure orfice, and said secondary plunger closed position in combination with said primary plunger closed position interrupting fluidic communication between said main orifice and said master cylinder inlet port; and a lip seal disposed between said value housing and said housing, said lip seal axially translatable on said valve housing between an open position and a closed position, said closed position corresponding to said lip seal axially translated against a portion of said at least one housing bore to block fluidic communication from said master cylinder inlet port around said valve housing to said inlet port, and said open position corresponding to said lip seal translated away from said portion of said at least one housing bore to permit fluidic communication from said inlet port around said valve housing to said master cylinder port.

14. The valve assembly as recited in claim 13 further including a flange received on said shoulder and having a chamfer, said chamfer bearing against said flared step of said tube thereby affixing said tube in said housing.

15. The valve assembly as rectied in claim 13 further including a coil assembly, said coil assembly affixed at least to a second end of said tube, said coil assembly operable between an energized state and a de-engergized state, said energized stat exerting a force on said primary plunger away from said secondary plunger.

16. The valve assembly as recited in claim 15 wherein said primary plunger includes a tapered nose, said tapered nose being received in said high pressure orifice and baring upon high pressure seat to block said fludic communication therethrough.

17. The valve assembly as recited in claim 16 wherein said secondary plunger includes at an end opposite from said primary plunger, apoppet formed thereon, said poppet at least partially received in a seat defined in said main orifice when said fludic communication is blocked between said master cylinder inlet port and said inlet port and when said primary plunger is in said primary plunger open position.

18. The valve assembly as recited in claim 17 wherein said poppet defines at least a portion of said high pressure orifice therethrough.

19. The valve assembly as recited in claim 13 wherein said lip seal includes an outer angled portion, and said at least one bore in said housing includes a corresponding angled bore portion upon which said lip seal bears in said lip seal closed position.

* * * * *